Dec. 11, 1928.                                       1,694,778
S. B. HASELTINE
FRICTION SHOCK ABSORBING MECHANISM
Filed Aug. 26, 1927                    2 Sheets-Sheet 2
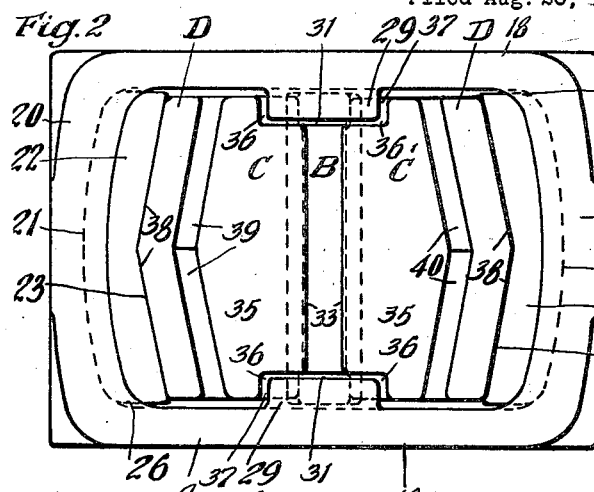
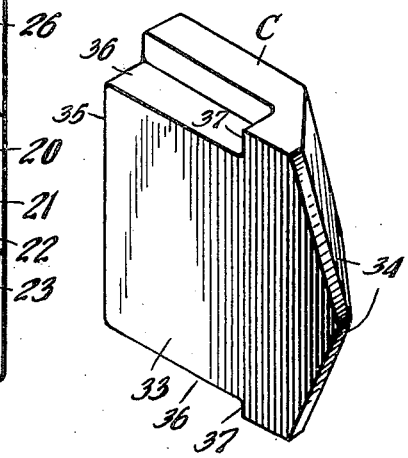
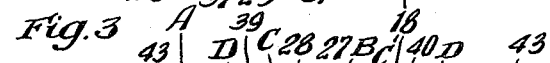
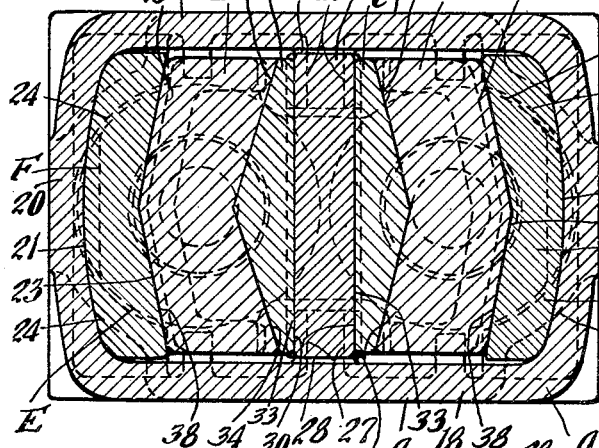
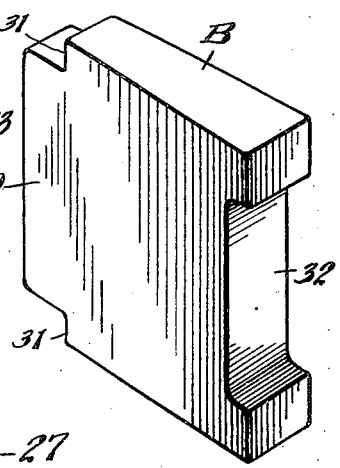
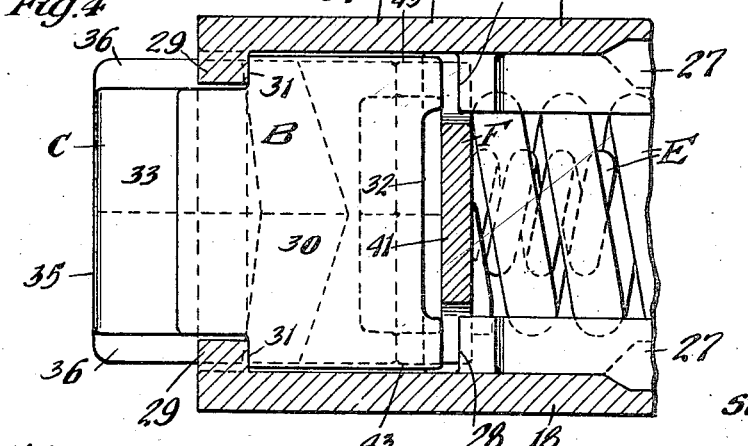
Witness
Wm. Geiger
Inventor
Stacy B. Haseltine
By George I. Haight
His Atty.

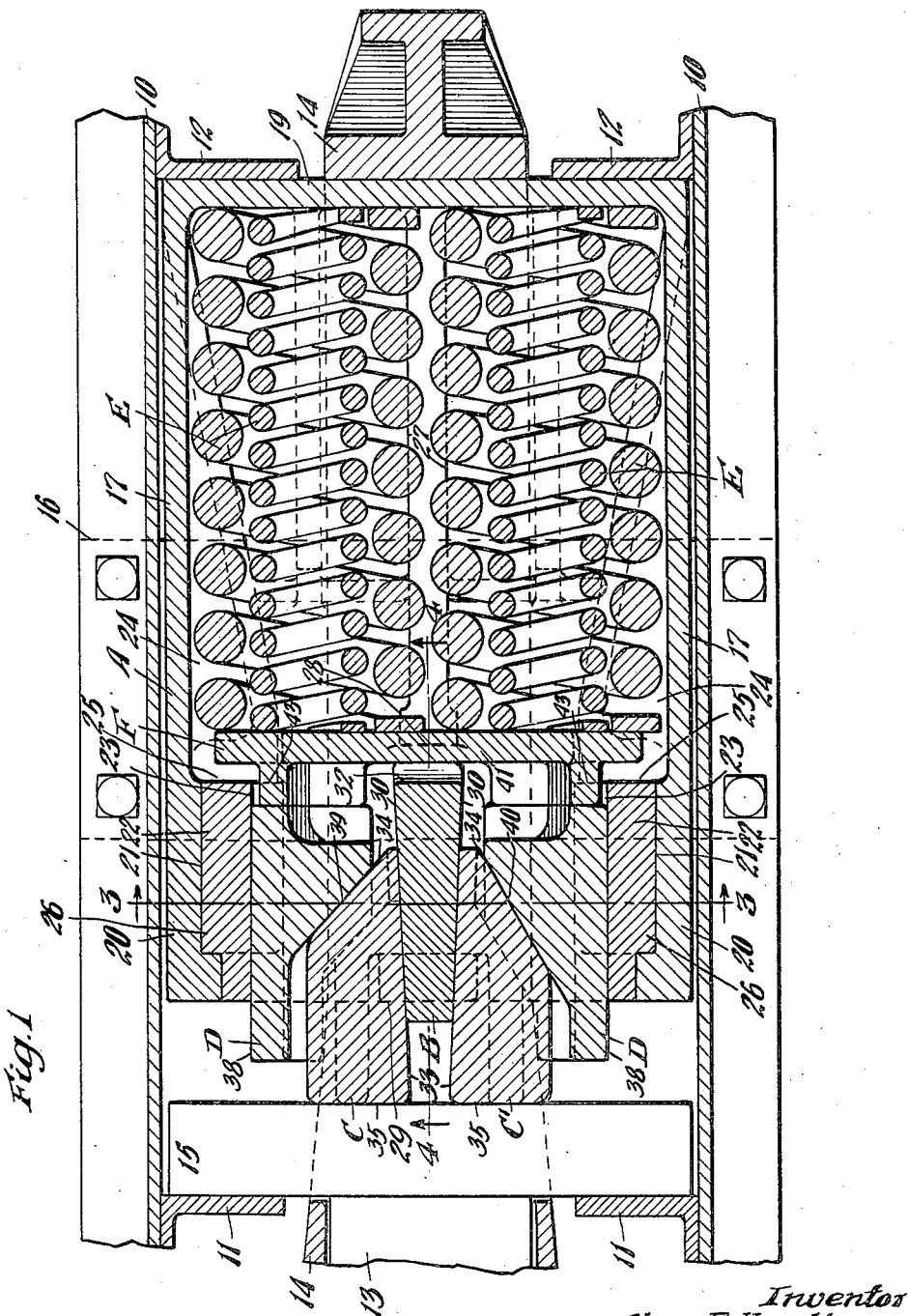

Patented Dec. 11, 1928.

1,694,778

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 26, 1927. Serial No. 215,563.

This invention relates to improvements in friction shock absorbing mechanisms.

One object of this invention is to provide a friction shock absorbing mechanism, especially adapted for railway draft riggings, wherein are obtained high capacity and easy release, the high capacity being produced by relatively large frictional areas on the friction elements, the friction elements including a friction post and friction wedge blocks cooperating with the post and having engagement with friction shoes cooperating with friction surfaces of a friction shell.

Another object of the invention is to provide a friction shock absorbing mechanism of the character indicated including a friction shell having friction shoes cooperating therewith, a central post having wedge means frictionally cooperating therewith, the wedge means having wedging engagement with the shoes, wherein simple and efficient means is provided for anchoring the wedge means to the shell and holding the post against longitudinal movement.

A more specific object of the invention is to provide in a friction shock absorbing mechanism including a friction shell, friction shoes, a split wedge and a central friction post with which the split wedge frictionally cooperates, wherein the friction shoes, wedge and shell have interengaging means thereon for limiting movement of the parts to a direction longitudinal of the mechanism, thereby preventing contact with the inactive walls of the shell and preventing wear of these walls, thereby adding greatly to the life of the gear.

Other objects of the invention will more clearly appear from the description and claims hereinafter following.

In the drawings, forming part of this specification, Figure 1 is a horizontal, longitudinal, sectional view of a portion of a railway draft rigging illustrating my improvements in connection therewith. Figure 2 is a front end elevational view of the shock absorbing mechanism proper. Figure 3 is a transverse vertical sectional view corresponding substantially to the line 3—3 of Figure 1. Figure 4 is a longitudinal, vertical, sectional view of the front end portion of the shock absorbing mechanism proper corresponding substantially to the line 4—4 of Figure 1. And Figures 5 and 6 are detailed perspective views, respectively, of one of the members of the split wedge and the friction post.

In said drawings, 10—10 denote the usual draft sills of a car underframe to the inner sides of which are secured front stop lugs 11—11 and rear stop lugs 12—12. The inner end portion of the draw-bar is designated by 13 to which is operatively connected a yoke 14 of well known form. The shock absorbing mechanism proper and a front main follower 15 are disposed within the yoke and the yoke in turn is supported by a detachable saddle plate 16 secured to the draft sills.

The improved shock absorbing mechanism proper, as shown, comprises broadly a casing A, a friction post B, a split wedge comprising two sections C and C'; a pair of friction shoes D—D; a twin arranged spring resistance E; and a main spring follower F.

The casing A is in the form of a substantially rectangular box-like member having longitudinally disposed spaced vertical side walls 17—17, horizontally extending spaced top and bottom walls 18—18 and a transverse vertical rear end wall 19. The end wall 19 cooperates with the rear stop lugs 12 in the manner of the usual rear follower. As most clearly shown in Figure 1, the side walls 17 of the casing A are inwardly enlarged at the forward end thereof, as indicated at 20. The enlarged sections 20 of the side walls are recessed, as indicated at 21, to receive enlargements on liners 22 to retain the latter assembled with the casing. The liners 22 are detachably mounted on the side walls and comprise plate-like members having longitudinally disposed inner friction surfaces 23 of V-shaped section. The opposed friction surfaces 23 of the liners are preferably disposed parallel to the axis of the mechanism. At each corner of the casing A the side and top walls are reinforced by longitudinally extending filler sections 24—24, the fillers being widest at the front end thereof and presenting transverse abutment faces 25, which engage the rear ends of the liners to prevent inward movement of the same. On the outer side each liner is provided with an enlargement 26 having a curved outer face fitting the correspondingly curved face of the recess 21 in the side wall of the casing A. The enlargements 26 are of such a length that they fit between the front end walls of the recesses 21 and the abutment faces 25 on the casing. The liners are thus positively held against movement longitudinally of the mechanism when the parts are assembled. The top and bottom walls 18 of the casing A are provided with centrally disposed longitudinally extending relatively wide interior ribs 27—27 presenting transverse abutment faces 28 at the forward end thereof cooperating with the inner end of the post B. At the forward end the top and bottom walls are also provided with relatively wide inwardly extending lugs 29—29, which, as hereinafter pointed out, cooperate with the post and the split wedge to limit outward movement of these parts.

The post B is in the form of a relatively heavy plate-like member having friction surfaces 30—30 on the opposite sides thereof. The post is preferably tapered so that the friction surfaces 30 diverge inwardly of the mechanism, as most clearly shown in Figures 1 and 6. At the forward end the top and bottom sides of the post are cut away as most clearly shown in Figures 4 and 6, thereby presenting vertically disposed abutment shoulders 31—31 adapted to cooperate with the lugs 29—29 at the front end of the casing A. Upon reference to Figure 4, it will be seen that the post B is of such a length that the inner end of the same is normally slightly spaced from the abutment faces 28 of the casing. It will be evident that the post is thus anchored to the casing for limited movement, thereby permitting a slight inward movement of the post during the initial compression of the mechanism. At the rear end the post B is centrally cut away as indicated at 32 to accommodate the central section of the spring follower F.

The split wedge comprises two similar members C—C', the same being disposed on opposite sides of the post B. Each of the members of the split wedge is provided with a longitudinally disposed flat friction surface 33 on the inner side thereof adapted to cooperate with the friction surface 30 at the same side of the post B. On the inner end each member of the split wedge is provided with an outer wedge face 34 of V-shaped section to cooperate with the corresponding friction shoe D. The wedge face 34 of the member C is preferably disposed at a relatively blunt angle with respect to the longitudinal axis of the mechanism, while the wedge face 34 of the member C' is disposed at a relatively keen wedge-acting angle with respect to said axis. The members C and C' present transverse flat outer faces 35, which bear directly on the main follower 15. At the top and bottom on the inner side, each member of the split wedge is cut away, as indicated at 36, thereby presenting transverse top and bottom abutment shoulders 37 at the inner end of said member. The abutment faces 37 engage in back of the lugs 29 on the top and bottom walls of the casing A, thus limiting outward movement of the members of the split wedge and holding the same assembled with the casing.

The two friction shoes D are of similar design, except as hereinafter pointed out. Each shoe D is interposed between one of the members of the split wedge and the liners at the corresponding side of the friction shell. Each shoe D has a longitudinally disposed outer friction surface 38 adapted to cooperate with the friction surface 23 of the corresponding liner. The friction surfaces 38 are of V-shaped section so as to interfit with the friction surfaces 23. Each of the friction shoes is provided with a lateral enlargement on the inner side thereof presenting a wedge face cooperating with the corresponding wedge face of the member of the split wedge at the same side of the mechanism, the wedge face of the shoe D which cooperates with the member C being designated by 39 and the wedge face of the shoe D which cooperates with the member C' being designated by 40. The wedge faces 39 and 40 are of V-shaped section so as to interfit with the wedge faces 34 of the members C and C', respectively, and are correspondingly inclined thereto.

By providing the interengaging V-shaped friction surfaces on the liners and shoes D and the interengaging V-shaped wedge faces on the wedge members C—C' and the shoes, these parts will be held against movement in a vertical direction, thereby limiting the movement thereof to a direction longitudinally of the casing A. As most clearly shown in Figures 2 and 3, the wedge members C and C' and the shoes D are of such a height that the top and bottom faces thereof will be at all times slightly spaced from the top and bottom walls 18 of the casing A. It will be evident that the friction shoes and the members of the split wedge will thus at all times be held out of contact with the top and bottom walls of the casing, thereby preventing wear of the latter and greatly adding to the life of the casing.

The spring resistance E comprises twin arranged members each including an inner coil and a relatively heavier outer coil, the coils having their opposite ends bearing respectively on the end wall 19 of the casing A and on the inner side of the spring follower F.

The spring follower F is in the form of a relatively heavy plate cut away at the top and bottom centrally thereof, as most clearly shown in Figure 4, thereby providing a central section 41 reduced in width, which is accommodated in the cut away portion 32 of the post when the post is moved inwardly, thereby preventing contact between the post and the spring follower. At the opposite sides, the spring follower F is provided with V-shaped ribs 43 forwardly projecting therefrom and engaging the inner ends of the friction shoes D. The parts are so proportioned that when assembled the spring resistance element E is under initial compression. As clearly shown in Figure 1, the spring follower F has the main body portion thereof normally slightly spaced from the inner ends of the liners 22, thereby permitting a certain amount of outward movement of the spring follower under the expansive action of the spring resistance E to compensate for wear of the various friction and wedge faces of the mechanism.

In assembling the mechanism the main spring resistance E together with the spring follower F are first inserted in the casing, the liners are then placed in position, the friction post inserted between the lugs 29 and the abutment shoulders or abutment faces 28 and the members of the split wedge placed in position with the abutment shoulders 37 thereof engaged in back of the lugs 29 of the casing.

The operation of my improved shock absorbing mechanism, assuming a compression stroke is as follows: The casing A and follower 15 will be moved inwardly relatively to each other, thereby carrying the split wedge C—C' inwardly of the mechanism and setting up a wedging action between the split wedge and the friction shoes D. The friction shoes D which are resisted by the main spring E will thus be pressed into intimate frictional contact with the liners 22. Due to the wedging action, the friction surfaces of the members C and C' will also be forced into tight frictional contact with the post B. Due to the friction existing between these last named parts the friction post B will be carried inwardly in unison with the split wedge during the first part of the compression stroke of the mechanism. During this inward movement of the post B the friction shoes D will slide on the friction surfaces of the liners, thereby producing a certain amount of frictional resistance. During the continued inward movement of the parts the inner end of the post B will be brought into engagement with the shoulders 28 of the casing, thereby positively arresting movement of the post. When movement of the post has been arrested, the members C and C' of the split wedge will be forced to slide on the friction surfaces of the post, thereby creating additional resistance. Due to the diverging relation of the friction surfaces of the post a differential action will be had, thereby forcing the friction shoes inwardly of the casing at a greater rate of speed than the inward movement of the members of the split wedge. As will be evident, an additional compression of the spring is thus effected. Inasmuch as the cooperating faces of one of the friction shoes and the members C of the split wedge are disposed at relatively blunt angles, lateral displacement of the parts due to the differential action will be taken care of by these cooperating faces. Inasmuch as the post B is substantially free to move laterally between the lugs 29 and the abutment faces 28, lateral movement of the parts due to the differential action will be taken care of.

The described action will continue either until the actuating force is reduced or the front end of the casing A is engaged by the follower 15, whereupon the actuating force will be transmitted directly through the casing A, the latter acting as a solid column to transmit the load to the stop lugs of the draft sills and prevent undue compression of the main resistance E.

During release of the mechanism upon the actuating force being reduced, the expansive action of the spring resistance E will force the parts outwardly. The initial release of the mechanism will be facilitated due to the arrangement of the blunt cooperating wedge faces on the members C of the split wedge and the cooperating friction shoes D. Inasmuch as the friction post is moved inwardly a slight distance away from the retaining lugs 29 of the casing during the initial compression of the mechanism, the post will be free to move outwardly during initial release, thereby also aiding in the releasing action of the mechanism. As the parts are forced outwardly by the main spring resistance E the friction post will be carried with the members C and C' until movement of the post is arrested by the lugs 29, whereupon the members C and C' and the friction shoes D—D will be carried outwardly with respect to the post B until movement of the members C—C' is limited by the abutment faces thereof coming into engagement with the lugs 29 of the casing.

From the preceding description taken in connection with the drawings, it will be evident that I have provided a friction shock absorbing mechanism of extremely simple construction having high frictional capacity due to the relatively large frictional areas provided. It is also pointed out that I have provided exceedingly simple and efficient retaining means for anchoring the post and split wedge to the casing, thereby holding the parts assembled.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a friction casing having opposed interior friction surfaces; of a pair of friction shoes cooperating with the friction surfaces of the casing, a central friction post; means on the casing for limiting inward movement of the friction post; a split wedge comprising members at the opposite sides of the post and having frictional engagement therewith, each of said members having a wedge face cooperating with a similar wedge face on the shoe at the corresponding side of the mechanism, the cooperating friction surfaces of the post and split wedge members being inclined to the longitudinal axis of the mechanism, thereby providing for differential action, the cooperating wedge faces of the split wedge and shoes and the cooperating wedge faces of the shoes and shell being of V-shaped section, thereby limiting movement of the shoes and split wedge to a direction longitudinal of the mechanism; and spring resistance means opposing inward movement of the shoes.

2. In a friction shock absorbing mechanism, the combination with a friction shell; of friction shoes cooperating with the shell, a central friction post; a split wedge comprising a pair of members disposed at opposite sides of the post and having wedging engagement with the shoes, the shell having integral abutment means formed thereon cooperating with abutment shoulders on the post and split wedge members to limit outward movement thereof.

3. In a friction shock absorbing mechanism, the combination with a casing provided with interior friction surfaces; of a friction post within the casing; of friction means cooperating with the post and friction shell surfaces, said friction means including a split wedge including two members disposed at opposite sides of the post; retaining means formed integral with the shell cooperating and with both the post and the split wedge to limit outward movement thereof; and a spring resistance opposing inward movement of the friction means.

4. In a friction shock absorbing mechanism, the combination with a casing having opposed side walls provided with interior friction surfaces; of a central friction post having friction surfaces on the opposite sides thereof; abutment means on the casing for limiting inward movement of the post; a pair of friction shoes cooperating with the friction surfaces of the casing; wedge members interposed between the friction shoes and the friction post, said wedge members having wedging engagement with the shoes and frictional engagement with the post; retaining lugs on the top and bottom walls of the casing engaging abutment means on the post for limiting outward movement thereof, said lugs also overlapping the wedge members and limiting outward movement of the latter; and spring resistance means opposing inward movement of the friction shoes.

5. In a friction shock absorbing mechanism, the combination with a friction shell; of a tapered central friction post; wedge blocks movable relatively to the post, said wedge blocks and post having cooperating friction surfaces; friction shoes cooperating with the friction shell, said shell and shoes having interengaging cooperating friction surfaces limiting relative movement of the shoes and shell to a direction longitudinal of the mechanism, said shoes and wedge blocks having cooperating wedge faces limiting relative movement of said shoes and blocks to a direction longitudinal of the mechanism; and spring means yieldingly opposing inward movement of the shoes.

In witness that I claim the foregoing I have hereunto subscribed my name this 24th day of August, 1927.

STACY B. HASELTINE.